Patented May 22, 1934

1,959,749

UNITED STATES PATENT OFFICE 1,959,749

PRODUCTION OF PRECIPITATED SILICA

Svend S. Svendsen, Madison, Wis., assignor to Clay Reduction Company, Chicago, Ill., a corporation of Illinois No Drawing. Application June 29, 1931,
Serial No. 547,781

35 Claims. (Cl. 23—182)

The present invention relates to improvements in the production of precipitated silica. It is a continuation in part of my prior applications 242,291, filed December 23, 1927, now Patent No. 1,859,998, and Serial No. 425,671, filed February 3, 1930.

In accordance with the present invention, I prepare a precipitated silica and control the characteristics thereof by the reaction of ammonium silicofluoride with water in the presence of ammonia, and by modifying the conditions of the reaction, as hereinafter more fully set forth. The reaction may, if desired, be carried out in the presence of water soluble salts. The reaction may be carried out in the presence of the reaction products resulting from the action of water on silicon diamminotetrafluoride; or, since one of the reaction products of the latter reaction is ammonium silicofluoride, the process of the present invention may be conducted as a further step in the handling of said reaction mixture. In order to distinguish the various reaction products involved, I designate the precipitated hydrated silica resulting from the action of water on silicon diamminofluoride as alpha-silica and that resulting from the action of ammonium silicofluoride on water in the presence of ammonia as beta-silica. The production of alpha-silica and the characteristics thereof are more fully set forth and claimed in my application Serial No. 543,027, filed June 8, 1931, as well as in my prior applications above referred to.

The general course of the reaction of ammonium silicofluoride on water in the presence of ammonia is indicated by the following empirical equation:

(1) 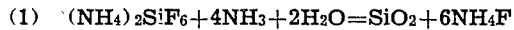 $(NH_4)_2SiF_6 + 4NH_3 + 2H_2O = SiO_2 + 6NH_4F$

The reaction of silicon diamminotetrafluoride and water, one of the products of which is ammonium silicofluoride, is indicated by the following equation:

(2) 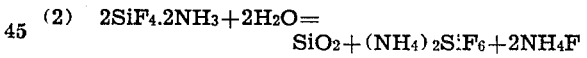 $2SiF_4.2NH_3 + 2H_2O = SiO_2 + (NH_4)_2SiF_6 + 2NH_4F$

The reaction indicated by Equation (1) and resulting in the formation of b\ 'a-silica is exothermic and as ordinarily conducted, is incomplete, as I have discovered. It is my belief that, as a result of the evolution of heat, that there is a dissociation of the ammonium fluoride formed into ammonium bifluoride and ammonia, the former of which attacks the precipitated silica. In the initial stages of the reaction, if ammonia water is added to a solution of ammonium silicofluoride, beta-silica is formed, first as a sol and, as ammonia is added, a transparent gel is precipitated. I have found that, to secure a complete reaction, the temperature of reaction must be kept at not above 34° C.; and by modifying the temperature conditions and the salt concentration of the aqueous liquid, I may increase the opacity of the precipitated beta-silica and its density. Thus, the opacity and density of the precipitation are increased with decreasing temperature of reaction; with increasing salt concentration of the aqueous ammoniacal liquid, and by the use of solid or crystalline ammonium silicofluoride intsead of a solution thereof. Thus, by reacting upon a solution of ammonium silicofluoride with ammonia or ammonium hydroxide at temperatures markedly below 34° C., say below 10° C., a more opaque beta-silica can be secured than at temperatures around 34° C. By increasing the salt concentration of the liquid, for example, the concentration of ammonium fluoride therein, or by using crystals of ammonium silicofluoride, greater opacity and density are likewise secured; and by contacting crystals of ammonium silicofluoride with an ammoniacal ammonium fluoride solution at a temperature markedly below 34° C., say between 0° C. and 10° C., a very dense, white precipitate of beta-silica is formed.

The precipitated beta-silica produced in accordance with the present invention is markedly different in its characteristics from the alpha-silica product resulting from the action of water on silicon diamino tetrafluoride. It is more highly tenacious of its water content, retaining about 7% on drying at 110° C. and still retaining about 5% of water on drying at 250° C. In distinction from the alpha-silica precipitate, a beta precipitate filter cake is markedly reduced below its original volume on first filtering by repulping and refiltering. The apparent density of the air-dried product is much greater than that of the alpha-silica, being from 30 to 45 lbs. per cubic foot. Its index of refraction varies from 1.44 for the more transparent products, to 1.40 for the opaque product. Its particle size is very small and the general form of the particles of beta-silica are of generally oblong form. On drying and calcining, the beta-silica particles adhere loosely and the beta-silica, in its more transparent forms, is transparent in oils, varnishes, resin oils and solutions and in its opaque form it is opaque in all media. The oil absorption is from one-half to one-third that of the alpha-silica. It is approximately the same as that of zinc white. The transparent form of beta-silica is highly suitable for use as an extender and as a base for lakes. The opaque form is an excellent pigment extender in paints and varnishes and forms a brilliant white pigment in cellulose lacquers and in water-base paints, such as casein paints. In such lacquers and paints, the opaque beta-silica has great hiding power and, by reason of its complete chemical inertness, is highly advantageous as a pigment. By reason of its colloidal condition, the transparent beta-silica is a very effective admixture for cements. The opaque beta-silica is an excellent constituent for polishes, particularly metal polishes as its hardness may be modified by calcining at various temperatures. The beta-silicas prepared in accordance with the present invention are of a high degree of purity and consequently constitute an excellent source of silica for the manufacture of articles of transparent fused quartz.

Thus, in carrying out the reaction in one embodiment of the present invention, I may add ammonia and water, for example, in the form of the commercial aqua ammonia, to a solution of ammonium silicofluoride. A silica sol is first formed, and as more ammonia is added, it precipitates out as gel. In order to complete the reaction, the temperature must be maintained at not over 34° C. and preferably at between 10 and 34° C., by cooling; for example, by ice, brine coils, ammonia expansion coils or the like. At temperatures approaching 34° C., the more transparent product is secured, and by decreasing the temperature at which the reaction mixture is maintained, great opacity is secured. The precipitated silica is filtered from the solution, which contains ammonium fluoride, repulped, for example, in a porcelain-lined ball mill, washed and filtered and the operations repeated to secure the desired purity and density of the product. In the repulping operation after the first filtration, the filter cake is reduced to a fraction of its original volume and its water content is correspondingly reduced.

The ammonium fluoride solution resulting from the reaction after removal of the precipitated silica may be employed as the vehicle in which the reaction is repeated and by reason of its salt content, a more opaque form of the beta-silica is secured. By reusing the ammonium fluoride solution in this manner repeatedly, its concentration of ammonium fluoride may be built up and when the maximum concentration suitable for use is attained, say 35 to 40%, the ammonium fluoride may be removed by crystallization, for example, by treatment with ammonia as described in my prior application Serial No. 425,671, above referred to. The ammonium fluoride concentration of the liquor is thereby reduced to approximately 15 to 20%. I have found an ammonium fluoride concentration ranging from 15 to 40% or thereabouts to be highly satisfactory in the conduct of the process of the present invention.

In general, in using a salt-containing solution, such as the ammonium fluoride solution above described, for the conduct of the reaction, I prefer to render it ammoniacal by suitable introduction of ammonia and introduce into it solid or crystalline ammonium silicofluoride while maintaining a temperature not above 34° C. By reducing the temperature to 10° or lower, say 0° C. to 10° C., by any suitable cooling means during reaction, a desirable opaque form of product may be secured. For example, the operation may be conducted in the following manner.

Ammonium silicofluoride crystals, preferably fine crystals, are added to an ammonium fluoride solution having an ammonium fluoride concentration of at least 10%, and in general from 15 to 40%, which solution is saturated with ammonia at below 10° C., say about 6° C. By cooling, the temperature is kept below 34° C., and preferably between 0° C. and 20° C. during the reaction. Any suitable cooling agent, for example, cold brine or expanding ammonia in coils or in a heat exchanger of a suitable non-corrodible metal may be employed as a cooling agent. The reaction proceeds rapidly with fine crystals, a somewhat longer time being required with larger crystals. A suspension of finely divided, opaque white beta-silica is formed in the liquor, which is a more concentrated ammonium fluoride solution. The precipitate is filtered out, repulped and washed in any suitable manner, for example, by countercurrent washing. The filtrate may be reused in the process until its ammonium fluoride concentration is built up to 30 to 40%. At such concentrations, on cooling to the desired temperature for saturation with ammonia and introduction of ammonia thereinto, a substantial part of the ammonium fluoride crystallizes out, leaving a liquor containing 15 to 25% ammonium fluoride, which in turn, may be reused in the silica precipitation process, as hereinbefore described.

The beta-silica product may be produced in accordance with the present invention in conjunction with the production of the alpha-silica product as described in my prior applications Serial No. 425,671 and Serial No. 543,027, above referred to. As described therein, silicon diammino tetrafluoride may be decomposed by reaction with water with the formation of the alpha-silica and ammonium silicofluoride, as indicated in Equation (2) above. The alpha-silica may be filtered out and the filtrate liquor containing ammonium silicofluoride or ammonium silicofluoride crystallized therefrom treated as hereinbefore described for the production of the beta-silica, or the beta-silica may be produced in the presence of the alpha-silica precipitate, thereby forming a mixed product. If the reaction with the silicon diammino tetrafluoride is conducted at elevated temperatures, above 34° C., it is necessary to cool the liquor or the reaction mixture before decomposition of the ammonium silicofluoride by the addition of ammonia in order to effect the precipitation of the beta-silica in accordance with the present invention. The combined reactions involving the decomposition of the silicon diammino tetrafluoride with formation of alpha-silica and the further decomposition of the ammonium silicofluoride may likewise be conducted at temperatures below 34° C. by application of suitable cooling media, the combined reaction being exothermic.

The mixture of alpha and beta-silica may be obtained by reacting upon silicon diammino tetrafluoride or a mixture thereof with ammonium silico fluoride with ammonia and water. In order to obtain complete decomposition of the silicon fluorine compounds, the reaction may be initiated at temperatures above 34° C., preferably in the neighborhood of 100° C., thereby securing complete decomposition of the silicon diammino tetrafluoride and subsequently cooling the reaction mixture and completing the reaction at below 34° C., although the combined reaction may be entirely conducted at 34° C. or lower. By modifying the conditions of the two stages of the reaction, varying degrees of transparency or opacity of the product can be secured. Thus, the transparency of the alpha-silica constituent may be increased by conducting the initial portion of the reaction at higher temperatures approaching 100° C., or may be decreased by carrying it out at lower temperatures, say at 34° C. or lower. Similarly, a more transparent beta product may be secured by carrying out the reaction at temperatures only slightly below 34° C., say from 20 to 30° C.; or a more opaque form of the beta-silica can be secured in the mixture by further reducing the temperature of the latter portion of the reaction, say to between 0° C. and 10° C. In general, the conditions for the precipitation of the beta product determine to a greater or less extent the characteristics of the mixture. Furthermore, by maintaining a high ammonium fluoride concentration, say between 25 and 35 to 40%, a greater opacity of the product can be secured.

The process of the present invention may desirably be employed in conjunction with processes for the decomposition of siliceous minerals wherein the silica content of the mineral is driven off in vapor form as silicon diammino tetrafluoride by reaction with ammonium fluoride. By contacting the vapors of the ammonia silicon fluorine compounds with ammonia and water under the conditions hereinbefore set forth, a more uniform and finer precipitated silica product is secured and the heat of the vapors, which are ordinarily at a temperature of 250° C. to 300° C. may be taken advantage of to heat the ammoniacal liquor, which may contain ammonium fluoride or other salt, to the desired temperature for decomposition or silicon diammino tetrafluoride and formation of the alpha-silica type of precipitate.

For example, vapors from a decomposition of siliceous mineral, at a temperature of 250 to 300° C. and containing silicon diammino tetrafluoride with ammonia and water vapors are contacted in a suitable scrubber packed with ceramic material, packing of non-corrodible metal or the like, with a descending current of ammonium fluoride solution containing more or less dissolved ammonia. The solution is heated by the vapor, the ammonia content of which reinforces the ammonia content of the liquor and becomes available for reaction upon the silicon diammino tetrafluoride. The latter is decomposed in the presence of the heated liquor, the temperature of which may be controlled to a greater or less extent by precooling the scrubbing liquid. The alpha-silica and ammonium silicofluoride are formed, together with ammonium fluoride, which increases the salt concentration of the solution. The resulting liquid, which contains suspended precipitated silica, is removed and if a separation of alpha-silica is desired, the liquid may be immediately filtered. However, in accordance with the present invention, it is preferably cooled by any suitable means, for example, by passage through a heat exchanger, to a temperature below 34° C. and to considerably lower if a more opaque product is desired. After cooling, the precipitated silica is filtered out, and may be repulped and washed in any suitable manner. The filtrate liquor may be returned for reuse. However, when its concentration becomes as high as 30 to 40% ammonium fluoride, it is desirable to crystallize out a greater or less proportion of its ammonium fluoride content as hereinbefore referred to. It is sometimes desirable to keep the liquid cooled to 34° C. or lower during the entire contacting operation, as hereinafter indicated.

By maintaining the liquor or ammonium fluoride solution with which the heated silicon diammino tetrafluoride is brought in contact or scrubbed at a low concentration, say 20 to 25% ammonium fluoride, and at a temperature near 100° C. and subsequently cooling to a temperature not greatly below 34° C., say from 30 to 34° C., a light, transparent, mixed precipitated silica is formed. As it is a mixture of the transparent alpha and beta types, it has characteristics of both these products. It is particularly suited for the compounding of linseed oil printing ink, for the production of lake pigments and in the compounding of paints, for the transparency of the material is of importance.

By maintaining a low temperature in the scrubbing or contacting operation, say 34° C. or lower, and by recirculating the ammonium fluoride solution so as to build up a considerable concentration thereof, say from 30 to 40%, a more opaque product is secured; and by lowering the temperature of contacting to from 0° to 10° C., a mixed precipitate is secured which in form resembles closely the opaque beta-silica. This precipitate is suitable as a white pigment extender and as a white pigment in water paints, such as those having a casein binder.

I claim:

1. The method of producing a precipitated silica which comprises contacting ammonium silicofluoride with an ammoniacal aqueous liquid while cooling the liquid so as to maintain the reaction mixture at a temperature below 34° C.

2. The method of producing a precipitated silica of controlled opacity which comprises contacting ammonium silicofluoride with an ammoniacal aqueous liquid and cooling the reaction to a predetermined temperature below 34° C.

3. The method of producing an opaque precipitated silica, opaque when freshly precipitated, which comprises contacting ammonium silicofluoride with an aqueous ammoniacal liquid while maintaining a temperature of 0° to 10° C.

4. The method of producing a precipitated silica of controlled opacity which comprises contacting ammonium silicofluoride with an ammoniacal aqueous solution and providing in said solution an initial salt content, thereby controlling the salt concentration of the latter, and the opacity of the precipitated silica.

5. The method of producing a precipitated silica which comprises reacting upon ammonium silicofluoride with an ammoniacal ammonium fluoride solution while cooling, so as to maintain a temperature below 34° C.

6. The method of producing a precipitated silica which comprises reacting upon ammonium silicofluoride with an ammoniacal aqueous ammonium fluoride solution having an ammonium fluoride concentration from 15 to 40%.

7. The method of producing a precipitated silica of controlled opacity which comprises reacting upon ammonium silicofluoride with an ammoniacal aqueous solution of ammonium fluoride while cooling, thereby maintaining a temperature below 34° C., and controlling the ammonium fluoride concentration to secure the desired opacity.

8. The method of producing a precipitated silica of controlled opacity which comprises reacting upon ammonium silicofluoride with an ammoniacal aqueous solution of ammonium fluoride, cooling to maintain a temperature during reaction below 34° C., and controlling the ammonium fluoride concentration and the temperature of reaction to secure the desired opacity.

9. The method of producing opaque precipitated silica which comprises reacting upon ammonium silicofluoride with an ammoniacal aqueous solution of ammonium fluoride having an ammonium fluoride concentration of 30 to 40% while cooling to maintain a temperature during reaction below 34° C.

10. The method of producing opaque precipitated silica which comprises reacting upon ammonium silicofluoride with an ammoniacal aqueous solution of ammonium fluoride having an ammonium fluoride concentration of 30 to 40% while cooling to maintain a temperature during reaction between 0° to 20° C.

11. The method of producing a precipitated silica which comprises introducing ammonium silicofluoride in vapor form into a cooled aqueous liquid in the presence of ammonia the cooling of the liquid being controlled to maintain a temperature below 34° C.

12. The method of producing a precipitated silica which comprises introducing ammonium silicofluoride in vapor form into an aqueous salt solution in the presence of ammonia and cooling to maintain a temperature below 34° C.

13. The method of producing a precipitated silica which comprises introducing ammonium silicofluoride vapors into an aqueous ammonium fluoride solution in the presence of ammonia and cooling to maintain a temperature below 34° C.

14. The method of forming precipitated silica which comprises reacting upon silicon diammino tetrafluoride with water, thereby forming a precipitated silica and ammonium silicofluoride, removing the precipitated silica, and then cooling the remaining liquid to a temperature below 34° C. in the presence of ammonia.

15. The method of producing precipitated silica which comprises introducing silicon diammino tetrafluoride into an aqueous liquid, thereby decomposing the former with the formation of a precipitated silica and ammonium silicofluoride, and cooling the reaction mixture to a temperature not above 34° C. in the presence of ammonia, thereby decomposing the silicofluoride and forming additional silica in the reaction mixture.

16. The method of producing precipitated silica which comprises contacting silicon diammino tetrafluoride vapors with an aqueous solution of ammonium fluoride in the presence of ammonia, completing the reaction at a temperature below 34° C.

17. The method of forming precipitated silica which comprises reacting upon silicon diammino tetrafluoride with an aqueous liquid at a temperature above 34° C., thereby decomposing said tetrafluoride with formation of a precipitated silica and ammonium silicofluoride, and cooling the reaction mixture to a temperature not above 34° C. in the presence of ammonia, thereby decomposing the silicofluoride and forming additional precipitated silica in the reaction mixture.

18. The method of producing a precipitated silica which comprises introducing silicon diammino tetrafluoride into an aqueous salt solution, while maintaining the latter at a temperature above 34° C., thereby converting the decomposition of tetrafluoride and forming a precipitated silica and ammonium silicofluoride, and cooling the reaction mixture to a temperature not above 34° C. in the presence of ammonia, thereby decomposing the silicofluoride and forming additional precipitated silica in the reaction mixture.

19. The method of forming precipitated silica which comprises introducing silicon diammino tetrafluoride into an aqueous ammonium fluoride solution, thereby decomposing the tetrafluoride with formation of a precipitated silica and ammonium silicofluoride, and cooling the reaction mixture to a temperature below 34° C. in the presence of ammonia, thereby decomposing the ammonium and silicofluoride with formation of additional precipitated silica in the reaction mixture.

20. The method of forming precipitated silica which comprises introducing silicon diammino tetrafluoride into an aqueous ammonium fluoride solution of at least 30% strength, thereby decomposing the tetrafluoride with formation of a precipitated silica and ammonium silicofluoride, and cooling the reaction mixture to a temperature below 34° in the presence of ammonia, thereby decomposing the ammonium and silicofluoride with formation of additional precipitated silica in the reaction mixture.

21. The method of forming precipitated silica which comprises introducing silicon diammino tetrafluoride into an ammoniacal solution of ammonium fluoride while maintaining a temperature not less than 34° C., thereby decomposing the silicon diammino tetrafluoride and forming a precipitated silica and ammonium silicofluoride, and cooling the reaction mixture to a temperature below 34° C., thereby decomposing the ammonium silicofluoride and forming additional precipitated silica.

22. In the method of producing precipitated silica by introducing silicon diammino tetrafluoride into an ammoniacal aqueous liquid, wherein the reaction is caused to take place in two stages, in the first of which a temperature exceeding 34° C. is maintained and in the second of which a temperature not exceeding 34° C. is maintained, controlling the transparency of the product by varying the temperature in each stage of the reaction so as to secure increased transparency at higher temperature ranges and decreased transparency at lower temperature ranges.

23. The method of producing a transparent precipitated silica which comprises introducing silicon diammino tetrafluoride into an aqueous ammoniacal liquid while maintaining a temperature approaching 100° C., thereby forming a transparent alpha-silica precipitate, and subsequently cooling the reaction mixture to a temperature of 20 to 34° C. and completing the decomposition, thereby forming a transparent beta-silica in the reaction mixture.

24. The method of forming a mixed precipitated silica which comprises reacting upon silicon diammino tetrafluoride with an aqueous ammonium fluoride solution, thereby forming an alpha-silica precipitate, cooling the reaction mixture and supplying ammonia therein while maintaining a temperature between 0° and 10° C., thereby forming an opaque beta-silica precipitate.

25. The method of forming a mixed precipitated silica which comprises reacting on silicon diammino tetrafluoride with an aqueous ammonium fluoride solution at a temperature above 34° C., thereby forming an alpha-silica precipitate, cooling the reaction mixture and supplying ammonia therein while maintaining a temperature between 0° and 10° C., thereby forming an opaque beta-silica precipitate.

26. A precipitated hydrated silica opaque in oil vehicles and having an index of refraction of about 1.40.

27. A precipitated silica containing about 7% water on drying at 110° C. and having an index of refraction about 1.40, said precipitated silica being opaque in oil and aqueous vehicles.

28. The method of producing a precipitated silica which comprises reacting upon ammonium silicofluoride crystals with an ammoniacal aqueous salt solution while cooling so as to maintain a temperature below 34° C.

29. The method of producing a precipitated silica which comprises reacting upon ammonium silicofluoride crystals with an ammoniacal aqueous ammonium fluoride solution at a temperature below 20° C.

30. The method of producing a precipitated silica which comprises reacting upon ammonium silicofluoride crystals with an ammoniacal aqueous ammonium fluoride solution having an ammonium fluoride concentration of from 15 to 40% and at a temperature between 0° and 10° C.

31. In the method of producing a precipitated dense silica, reacting upon ammonium silicofluoride with an ammoniacal aqueous ammonium fluoride solution while maintaining a temperature below 34° C., filtering the precipitated silica from the mother liquor and repulping the filtered silica.

32. The method of producing a precipitated dense silica which comprises reacting upon ammonium silicofluoride with an ammoniacal aqueous ammonium fluoride solution while maintaining a temperature below 10° C., filtering the precipitated silica from the mother liquor and repulping the filtered precipitated silica.

33. The method of increasing the density of a precipitated silica opaque in oil vehicles and produced by reacting ammonium silicofluoride with an ammoniacal aqueous salt solution in the cold which comprises mechanically working said precipitated silica in the presence of water.

34. The method of producing dense, discrete particles of precipitated silica, which comprises reacting upon a soluble silicofluoride with an ammoniacal aqueous liquid, while cooling to maintain a temperature below 34° C. during reaction, filtering the precipitated silica particles from the mother liquor and subjecting the wet, separated, silica filter-cake to mechanical working and again filtering the same, thereby reducing the volume of the wet silica.

35. The method of producing dense, discrete particles of precipitated silica, which comprises reacting upon ammonium silicofluoride with an ammoniacal aqueous liquid, while cooling to maintain a temperature below 34° C. during reaction, filtering the precipitated silica particles from the mother liquor and subjecting the wet, separated silica filter-cake to mechanical working and again filtering the same, thereby reducing the volume of the wet silica.

SVEND S. SVENDSEN.